Sept. 10, 1929.  J. SCHULZ  1,727,449
SHEET METAL CASING FOR PHOTOGRAPHIC FILMS
Filed Aug. 8, 1927   3 Sheets-Sheet 1
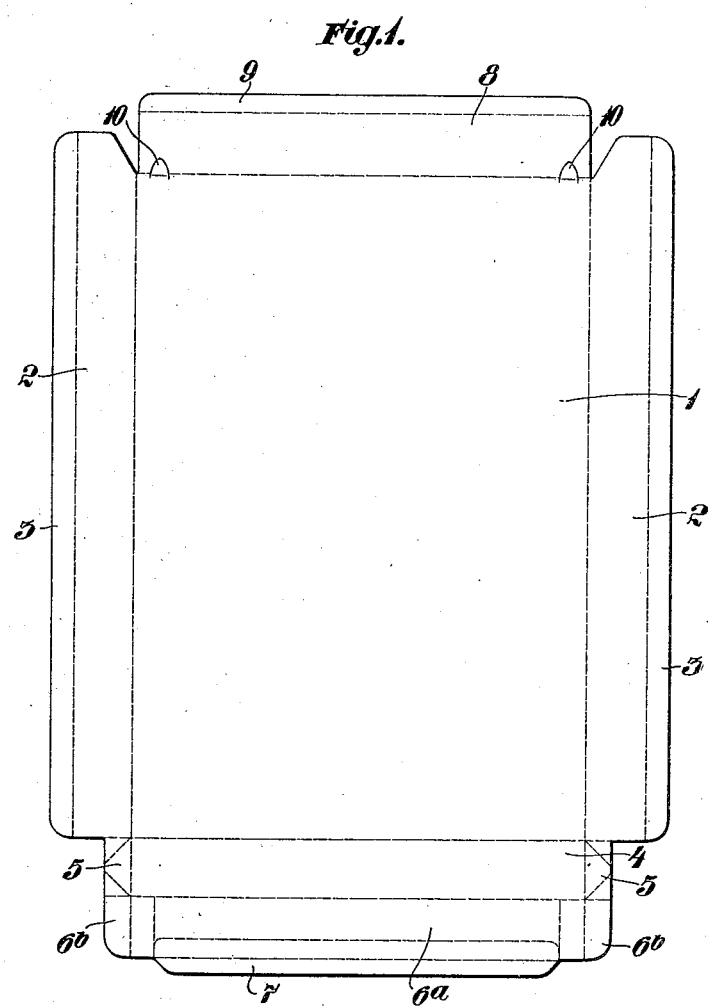
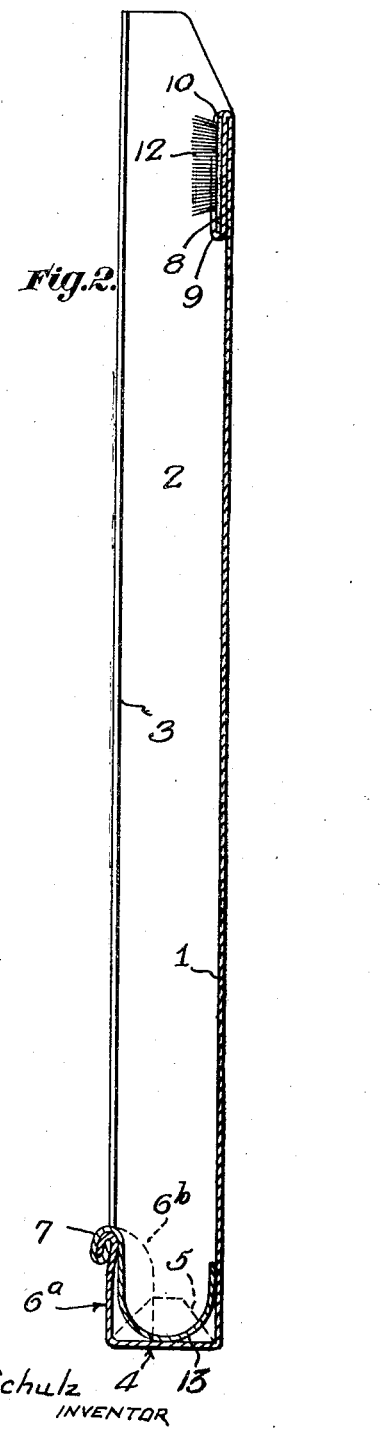
J. Schulz
INVENTOR
By: Marks & Clerk
Attys.

Sept. 10, 1929.  J. SCHULZ  1,727,449
SHEET METAL CASING FOR PHOTOGRAPHIC FILMS
Filed Aug. 8, 1927  3 Sheets-Sheet 2
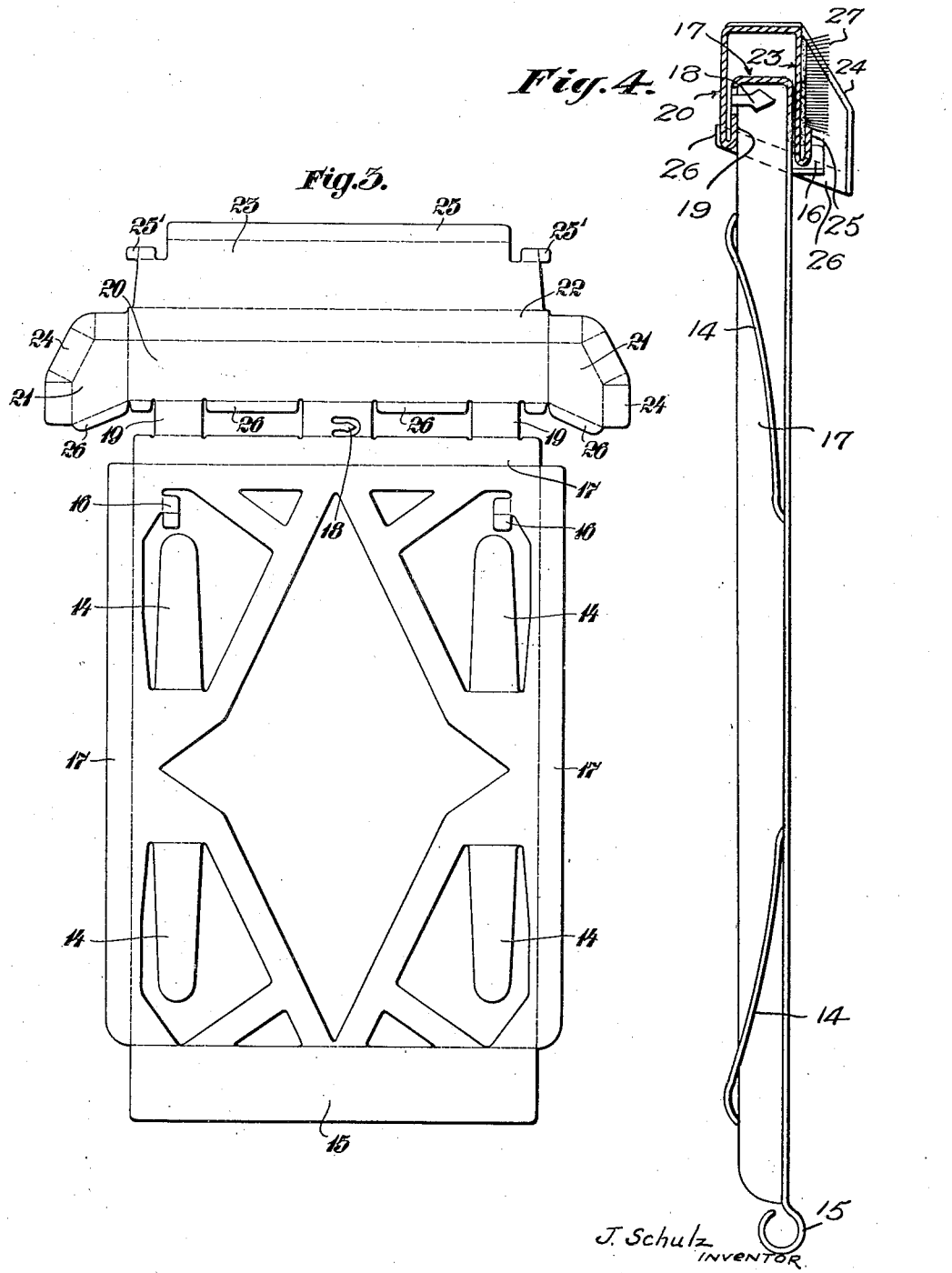

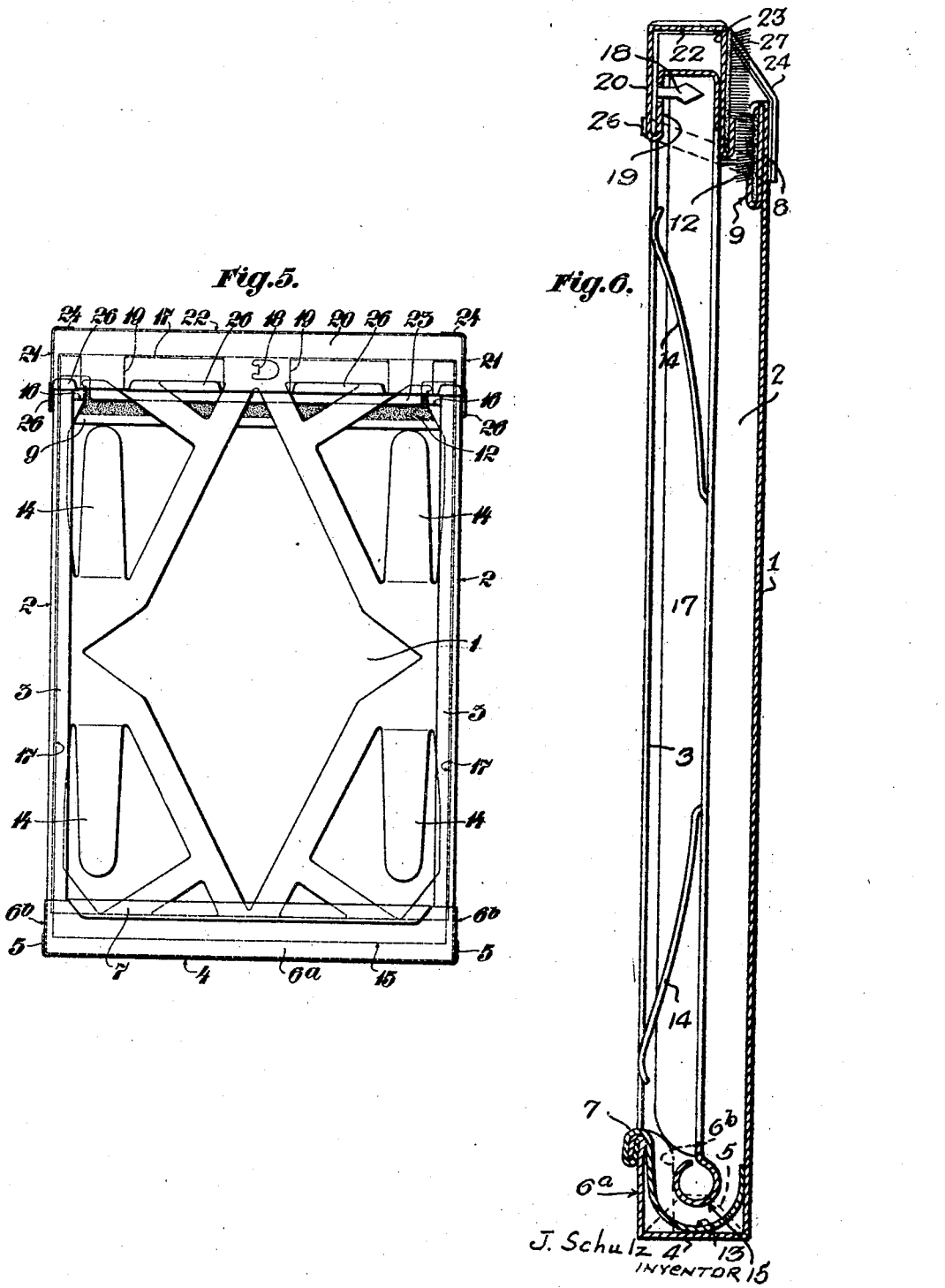

Patented Sept. 10, 1929.

1,727,449

UNITED STATES PATENT OFFICE.

JOSEF SCHULZ, OF BARMEN, GERMANY.

SHEET-METAL CASING FOR PHOTOGRAPHIC FILMS.

Application filed August 8, 1927, Serial No. 211,575, and in Germany June 10, 1927.

This invention relates to sheet-metal casings of the kind intended to receive photographic films, and termed "film-packs" when being filled with such ones. I am, thus, aware of the fact that sheet-metal casings for the purpose stated are known, but while the known photographic film casings are composed of three main sheet-metal parts, the present improved casing is composed of only two such parts, but is nevertheless perfectly light-proof.

A particular advantage of the improved casing resides therein that it can be designed in equal manner for all known sizes of photographic films, as well as for any desired number of such films, say 3 or 6 or 12 or more, just as desired.

The sheet-metal film-pack casing comprises the casing proper and an insertion constituting a kind of movable partition wall located between the films to be exposed and the exposed films and leaving between its lower edge or rim and the bottom of the casing proper a passage through which the exposed films are conveyed from the front of the casing proper to the rear thereof. The head of the insertion is so designed that it forms a light-proof hood over the films not yet exposed, and means are provided at the top of the rear space from which the exposed films are to be withdrawn to withdraw them singly, never two at a time, as occurs oftentimes with the film-packs at present in use.

The invention is illustrated diagrammatically and by way of example on the accompanying drawings, on which Fig. 1 is a view of a piece of sheet-metal as employed for making one of the two members constituting the casing, viz the casing proper, whereas Fig. 2 is a longitudinal section through the finished casing proper; Fig. 3 is a view of another piece of sheet-metal as employed for making the other of the two members constituting the complete casing, viz an insertion separating the exposed films from the non-exposed ones, whereas Fig. 4 is a longitudinal section through the finished insertion; Fig. 5 is a view of the assembled two members, and Fig. 6 is a longitudinal section through them.

Each of the two members mentioned is punched out of sheet-metal and certain portions of each of the pieces are then bent off on the dotted lines shown in Figs. 1 and 3. The numerals 1–13 pertain to the casing proper, and the numerals 14–27 to the insertion.

The casing proper consists of the following parts: the rear wall or back 1, the side-walls 2, the flanges 3 of the side-walls, the bottom 4, the lateral flanges 5 of the bottom, the front flange 6$^a$ of the bottom, the end-portions 6$^b$ of this flange, the folded rim 7 of the film guide member 13 located just over the bottom 4, the rim 8 at the upper end of the rear wall 1 for holding a strip of plush 12 located at the exit portion of the casing, the flange 9 which contributes to fasten the strip of plush, and the tongues 10 which are provided for the same purpose, all as more fully described hereinafter.

In the bent state of the sheet-metal piece Fig. 1, the side-walls 2 and the front flanges 3 of the same lie behind the front wall 6$^a$ and the rearwardly bent end-portions 6$^b$ of the bottom 4, as shown in Fig. 5. The rim-like portion 7 of the front-wall 6$^a$ is folded outwardly and downwardly and serves for holding the piece of guide paper 13 by and over which every exposed film is guided from the open side or face of the casing to the closed side or rear wall of the same.

A fold is provided also at the upper rim of the rear wall of the casing, in that first the portion 8 is bent round inwardly and downwardly so as to lie parallel to the body portion of the rear wall, and then the rim 9 of the portion 8 is again bent upwardly so as to form a groove able to receive a strip of plush 12. The small punched-out tongues 10 which remained extending upwardly when the portion 8 was bent as stated are now bent downwardly over the strip 12 whereby this is firmly retained in the groove mentioned.

The insertion shown separately in Figs. 3 and 4 is so punched out that flat springs 14 are formed by which the films are pressed against the inner faces of the flanges 3 of the side-walls 2 of the casing. There are two upper springs 14 which extend upwardly and two lower springs which extend downwardly.

Near the upper ends of the upper springs are small members 16 which are bent rearwardly (Fig. 4) and serve as abtument members for the exposed films located between the insertion and the rear wall of the casing and having been conveyed from the front side of the insertion to the rear side thereof by and over the piece of guide paper 13 already mentioned, as well as by and below a tubularly bent rim 15 (Figs. 3 and 4) forming a guide passage together with said part 15.

The insertion member has, besides the tubularly bent lower rim 15, an upper rim 17 and two lateral rims 17, 17 which are bent off at right angles with respect to the body portion of the insertion and are directed forwardly so as to contact with the flanges 3 of the casing 1. The upper rim 17 of the insertion is integrally connected with three short individual flanges or flange portions 19, Fig. 3 of which the middle one is so punched as to form a tongue 18 which is bent inwardly, as in Fig. 4, and the object of which is to keep the films in the insertion, at the front-face thereof, between the bent-off lateral rims 17, 17, in proper position.

The body of the insertion comprises, further, portions 20, 22, 23 and 25, having lateral lugs 21, 24 and 25' (Fig. 3), and between the upper flange portions 19, as well as laterally from them, are small ledge-like portions 26, of which the two located lefthand and righthand from the middle flange portion 19 are bent outwardly, as in Fig. 4, after the portions 20, 22, 23 and 25 have been bent in the manner shown in Fig. 4. These portions, together with the lateral portions 21 and 24, form a hood which extends over the entire upper opening of the casing 1 and covers and closes it lightproof.

The directions in which the top portions 17, 19, 20, 22, 23 and 25 extend after having been bent as suited for the purpose in view are as follows: The portion 17 is bent forwardly and horizontally (counter to the rear wall of the casing proper 1); the portions 19 are bent vertically and downwardly; the portion 20 is bent upwardly, the portion 22 rearwardly and horizontally so as to lie over, and somewhat remote from, the portion 17; the portion 23 is bent downwardly so as to lie behind the upper rim of the body of the insertion and practically in contact therewith; and the portion 25 is bent upwardly so as to form a gutter in which a strip of plush 27 can be fixed. The lower portion of this strip lies opposite the upper portion of the strip of plush 12 (Figs. 2 and 6). The lateral lugs 21 of the upwardly bent portion 20 are bent off rearwardly (Figs. 4 and 5) and the smaller lugs 24 are bent towards one another over and upon the portion 22. The lugs 21 extend so far rearwardly as to close laterally the spaces between the bent portions 20, 22 and 23, and extend even further rearwardly beyond the back of the casing proper 1, as shown especially in Fig. 6.

The two outermost ledges 26 (Fig. 3) serve for stiffening the lugs 21, for which purpose they are bent round, as shown in dotted lines in Figs. 4 and 6 (tops of the figures). The small lugs 25' serve for retaining the bent-off lugs 21 and 24 in their proper position. The combined lugs 21 and 24 have oblique edges near the transition to the portion 22 which render it possible, later on, when the several portions have been bent, as in Figs. 4 and 6, to grasp more easily the individual films and withdraw them parallel to the casing and its insertion.

The above described improved film-pack casing is suited for use with great efficiency especially in the dark-room, when filling it with films to be exposed, and when removing the exposed films. An important feature resides also therein that no separate closing cap is needed which could get lost or fall down and be trodden upon, and so on, all misfortunes which are likely to render the entire film-pack useless. Finally, it can no more occur that two films are drawn when only one is to be exchanged.

I wish it to be understood that I do not limit myself to the exact details shown in the drawings merely by way of example. There may be departures in the details without departing from the gist of the invention. There may be provided, for instance, other lugs or more lugs or tongues or the like for securing the bent portions in their proper position relatively to one another or for connecting them with one another.

I claim:

1. A two part sheet-metal casing for photographic films, film-packs, and the like, comprising, in combination, a body member forming the back, the sides, and the bottom of the casing, and an insertion forming a closure for the body member and located between the closed back and the open front and dividing the casing into two chambers, of which the front chamber is adapted to receive the non-exposed films, and the rear chamber, the exposed ones.

2. A sheet-metal casing for photographic films, film-packs, and the like, comprising, in combination, a body member forming the back, the sides, and the bottom of the casing, and an insertion located between the closed back and the open front and forming at its top a hood, and dividing the casing into two chambers, of which the front chamber is adapted to receive the non-exposed films, and the rear chamber the exposed ones.

3. A sheet-metal casing for photographic films, film-packs, and the like, comprising, in combination, a body member forming the back, the sides, front-flanges extending continuously from the top to the bottom at said sides, and the bottom of the casing, and an insertion located between the closed back and the open front and dividing the casing into two chambers, of which the front chamber is adapted to receive the non-exposed films, and the rear chamber the exposed ones.

4. A sheet-metal casing for photographic films, film-packs, and the like, comprising, in combination, a body member forming the back, the sides, and the bottom of the casing, and an insertion located between the closed back and the open front and dividing the casing into two chambers, of which the front chamber is adapted to receive the non-exposed films, and the rear chamber the exposed ones, the upper portion of said back being bent inwardly and downwardly and the rim of this portion being so bent as to form a fold, and said sides being cut off obliquely at said bent upper portion of the back; and a strip of plush inserted into said fold.

5. A sheet-metal casing for photographic films, film-packs, and the like, comprising, in combination, a body member forming the back, the sides, and the bottom of the casing, and an insertion located between the closed back and the open front and forming at its top a hood and dividing the casing into two chambers, of which the front chamber is adapted to receive the non-exposed films, and the rear chamber the exposed ones, said hood being integral with the body portion of said insertion.

6. A sheet-metal casing for photographic films, film-packs, and the like, comprising, in combination, a body member forming the back, the sides, and the bottom of the casing, and an insertion located between the closed back and the open front and dividing the casing into two chambers, of which the front chamber is adapted to receive the non-exposed films, and the rear chamber the exposed ones, a bent-off rim portion at the top of said insertion, a front-wall portion located in front of said rim-portion, connecting members between said two portions, an inwardly bent tongue punched out of one of said connecting members, substantially and for the purpose set forth.

In testimony whereof I affix my signature.

JOSEF SCHULZ.